(12) United States Patent
Kossar et al.

(10) Patent No.: US 10,479,473 B2
(45) Date of Patent: Nov. 19, 2019

(54) OMNIDIRECTIONAL FRANGIBLE JOINT

(71) Applicant: Insitu, Inc, Bingen, WA (US)

(72) Inventors: Chad Stuart Kossar, Hood River, OR (US); Bradley Yeomans, Portland, OR (US); Matthew Grubb, White Salmon, WA (US)

(73) Assignee: Insitu, Inc, Bingen, WA (US)

( * ) Notice: Subject to any disclaimer, the term of this patent is extended or adjusted under 35 U.S.C. 154(b) by 459 days.

(21) Appl. No.: 15/198,953

(22) Filed: Jun. 30, 2016

(65) Prior Publication Data

US 2018/0001990 A1  Jan. 4, 2018

(51) Int. Cl.
*B64C 1/36* (2006.01)
*F16B 31/02* (2006.01)
*B64C 39/02* (2006.01)

(52) U.S. Cl.
CPC .............. *B64C 1/36* (2013.01); *B64C 39/024* (2013.01); *F16B 31/021* (2013.01); *B64C 2201/084* (2013.01); *B64C 2201/182* (2013.01)

(58) Field of Classification Search
CPC ........ B64C 1/36; B64C 39/024; F16B 31/021
USPC ........................................................ 244/131
See application file for complete search history.

(56) References Cited

U.S. PATENT DOCUMENTS

| | | | |
|---|---|---|---|
| 1,917,939 A | 7/1933 | Heeter | |
| 4,834,569 A | 5/1989 | Foote et al. | |
| 5,201,814 A * | 4/1993 | Kitchell | E21B 17/023 166/377 |
| 5,390,606 A * | 2/1995 | Harris | B64G 1/641 102/275.11 |
| 5,417,501 A * | 5/1995 | Hyde | F01D 21/045 384/542 |
| 6,398,483 B1 * | 6/2002 | Conete | F01D 17/162 415/130 |
| 8,142,126 B2 | 3/2012 | Porter et al. | |
| 8,555,481 B2 | 10/2013 | Porter et al. | |
| 8,991,793 B1 | 3/2015 | Bernhardt | |
| 2005/0268807 A1* | 12/2005 | Bambach | F42B 5/035 102/438 |
| 2007/0253804 A1* | 11/2007 | Heyerman | F01D 9/026 415/9 |
| 2012/0061520 A1 | 3/2012 | Graham | |

(Continued)

*Primary Examiner* — Brian M O'Hara
*Assistant Examiner* — Keith L Dixon
(74) *Attorney, Agent, or Firm* — Miller, Matthias & Hull LLP

(57) ABSTRACT

A reusable frangible joint includes a first part having a hemispherical convex surface, and a second part defined by a reversely identical mating hemispherical concave surface. The convex and concave surfaces of the joint are secured and held together in compression until a predetermined applied load causes the joint to fail. The joint includes at least one replaceable fastener that rigidly secures and holds the respective concave and convex surfaces together. The fastener, designed to be the only part of the joint configured to fail, is sheared apart under the predetermined load, which results in separation of the concave and convex parts from one another irrespective of from which direction or to which part the impact load is applied. The failed fastener can then be replaced, wherein the frangible joint becomes immediately reusable, as having incurred no other damage by the impact load.

16 Claims, 6 Drawing Sheets

(56) References Cited

U.S. PATENT DOCUMENTS

2013/0236234 A1 9/2013 Kaczynski
2014/0299708 A1* 10/2014 Green .................... B64C 27/32
244/17.23

* cited by examiner

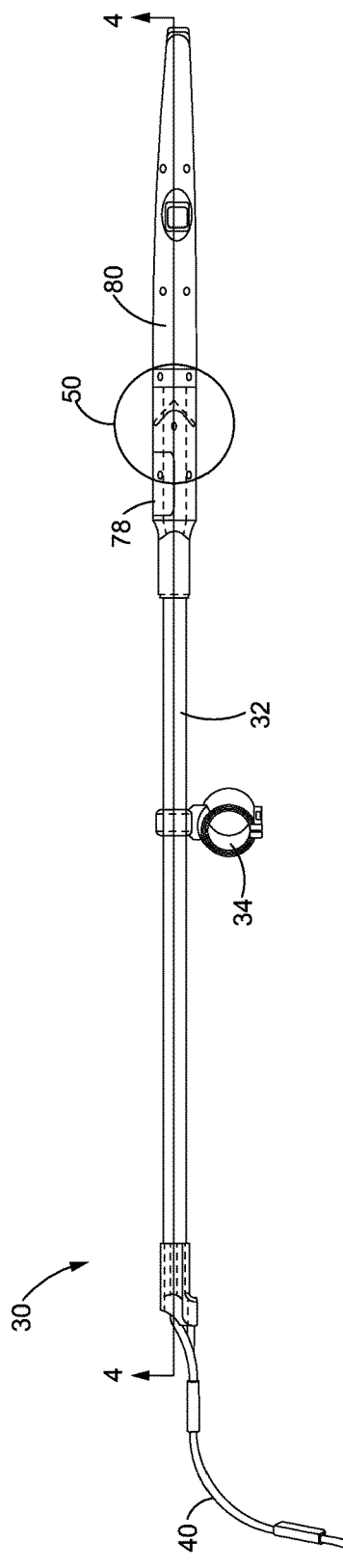
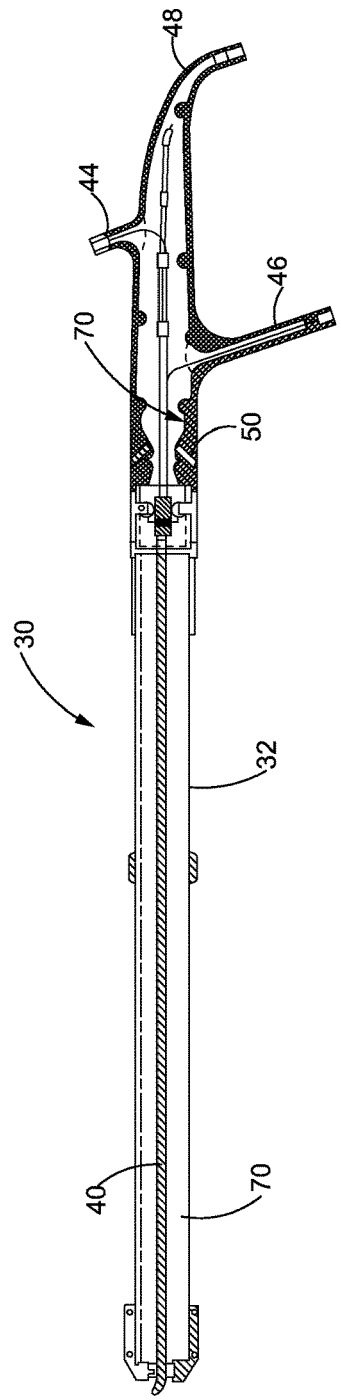
FIG. 3
FIG. 4

OMNIDIRECTIONAL FRANGIBLE JOINT

GOVERNMENT LICENSE RIGHTS

This disclosure was developed and/or modified with government support under a program awarded by the United States Department of Defense, entitled "Spectral Bat Phase 3 Frangible Antenna Array". Thus, the United States government has license rights to any patents obtained hereunder.

FIELD

The present disclosure relates generally to frangible joints, and more specifically to such joints designed to fail and break apart under predetermined impact loads having any hemispherical orientation.

BACKGROUND

Modern unmanned aircraft are useful in various military reconnaissance and surveillance activities. In many cases, such so-called "unmanned aerial vehicles" (UAVs) are preferred over manned aircraft for reasons of safety and cost, particularly when used in high risk combat missions.

UAVs are typically catapulted into flight by launch mechanisms for completion of variously defined missions. Upon completion of a mission, a UAV may be physically captured by means of a UAV retrieval system utilizing a vertical pole and rope line, which ensnares and/or snags the UAV at the end of a mission flight. Antennas attached to the UAV may be particularly vulnerable to damage during snagging of the UAV by a rope line during its capture and retrieval.

Any resultant capture damage to antennas may be minimized or alleviated by the use of frangible booms which hold the antenna apart and away from the physical body of the UAV; the booms are used to avoid signal interference and other issues. One particular issue with frangible booms, however, has involved expense of part replacement. As such, improved frangible booms are needed to reduce both part replacement time and cost.

SUMMARY

In a first form of the disclosed embodiment, a reusable frangible joint includes a first part having hemispherical convex surface, and a second part having a reversely identical mating hemispherical concave surface. The concave surface is held in compression against the convex surface. At least one fastener secures the respective concave and convex surfaces rigidly together. A predetermined impact load applied against either of the first or second parts is configured to shear the fastener, and to separate the first and second parts from one another.

In a second form of the disclosed embodiment, a system of using a reusable frangible joint having a fracture pin on an unmanned aerial vehicle retrievable via a vertical pole and rope line includes securing an elongated boom containing a frangible joint to a fuselage of an unmanned aerial vehicle. The frangible joint has proximal and distal portions with respect to the fuselage of the unmanned aerial vehicle. The proximal and distal portions are secured together by a fracture pin. An antenna is attached to the distal portion of the frangible joint, and the unmanned aerial vehicle is launched, flown, and subsequently captured while in flight by means of a vertical pole and rope line. If the rope line impacts the distal portion of the frangible joint with a predetermined impact load, the fracture pin of the frangible joint is designed to break apart; i.e. to fail. The failed fracture pin is then removed, and a new fracture pin is installed within the frangible joint to provide for immediate reuse of the frangible joint.

In a third form of the disclosed embodiment, a method of making a reusable frangible joint having two adjacent parts includes the steps of forming mating hemispherical parts, wherein a first part is concave and a second part is convex; securing the concave and convex surfaces in compression against each other with at least one fastener; applying a predetermined impact load applied against either of the first or second parts, wherein the load is configured to shear the fastener and to separate the first and second parts of the frangible joint from one another.

All features, aspects, functions, and advantages disclosed herein may be achieved independently in various embodiments or may be combined in yet other embodiments, the details of which may be better appreciated with reference to the following description and drawings.

BRIEF DESCRIPTION OF THE DRAWINGS

FIG. 3 is a frontal view of an antenna boom which contains the omnidirectional frangible joint, with the boom shown unsecured from the unmanned aerial vehicle of FIGS. 1 and 2, and depicting an orientation of the antenna boom as would be viewed along lines 3-3 of FIG. 1.

FIG. 4 is cross-sectional view of the antenna boom, shown along lines 4-4 of FIG. 3.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description is intended to provide both apparatus and methods for carrying out the disclosure. Actual scope of the disclosure is as defined by the appended claims.

Figure 1:
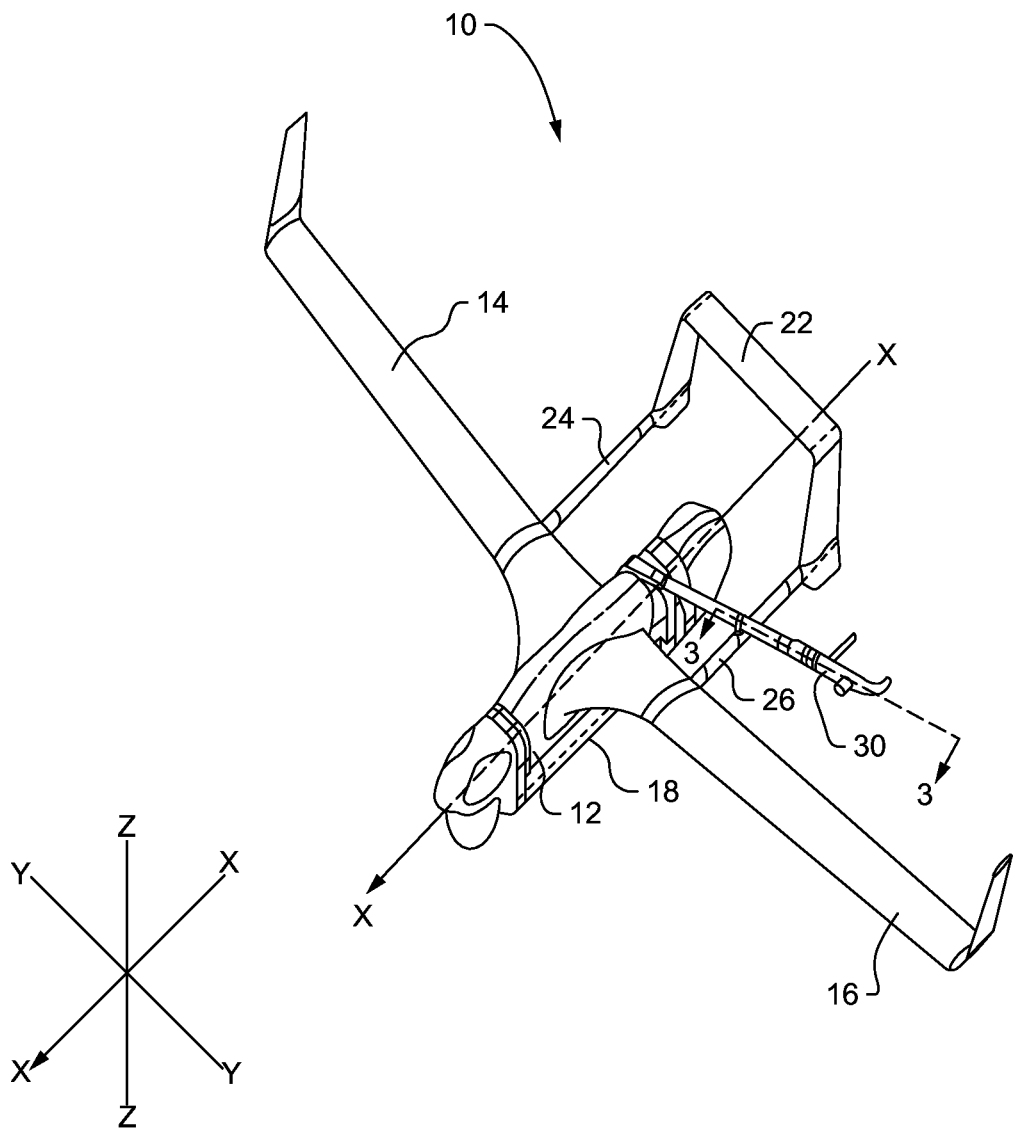
FIG. 1 is a schematic perspective view of an unmanned aerial vehicle that includes an omnidirectional frangible joint, as may be constructed in accordance with the present disclosure.

In FIG. 1, an unmanned aerial vehicle (UAV), such as a drone, includes a fuselage 12, left and right wings 14, 16, and a wheel-less under-carriage 18, to the extent that this particular UAV is designed to be launched into the air by means of a catapult mechanism (not shown). The UAV further includes a tail 22 that includes typical elevator flight controls. In the particular embodiment displayed, the tail 22 is secured to the wings 14, 16 by means of right and left tail support booms 24, 26.

Orthogonal XYZ coordinates are shown offset from the body 12 of the UAV 10 in FIG. 1. The coordinates reflect the three-dimensional space in which the UAV travels; the X-X direction is representative of the forward motion of the UAV 10, while side-to-side motion is reflected by the Y-Y axis. The Z-Z axis reflects the vertical or up-and-down movements of the UAV 10. It will be appreciated that the fuselage 12 extends along the X-X axis, while the wings 14, 16 extend along the Y-Y axis, as examples, only. As indicated in FIG. 1, the fuselage 12 of the UAV 10 is configured for primary flight movement along the X-X axis.

Continuing reference to FIG. 1, an elongated antenna boom 30 is secured to the fuselage 12 of the UAV 10. The boom 30 extends substantially along the Y-Y axis, and thus away from the fuselage. As will be appreciated by those skilled in the art, it is desirable that all associated antennas of the UAV are well spaced from the fuselage to avoid signal interference. For additional support, the antenna boom 30 is also shown secured to the left tail boom 26, which extends parallel to the X-X axis of the fuselage 12.

Figure 2:
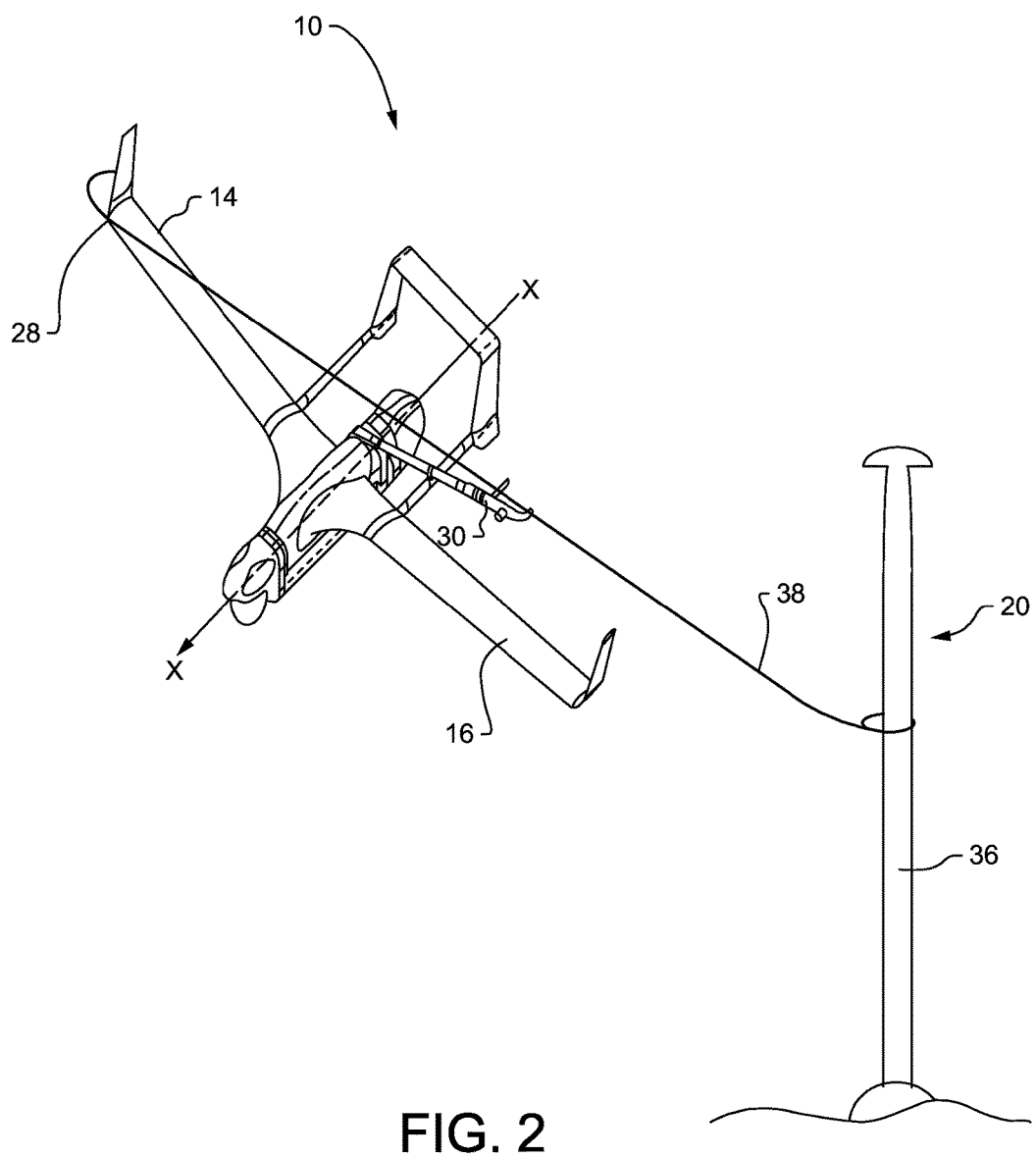
FIG. 2 is a schematic perspective view of same unmanned aerial vehicle of FIG. 1, but shown being snagged or captured by a UAV recovery system.

Referring now also to FIG. 2, the UAV 10 is depicted approaching a UAV recovery system 20, which includes a mast-like vertical pole 36 having a rope line 38 for snagging the UAV 10. In the depiction, the UAV capture point 28 is at the right wing 14, although other capture/snag points likely include the antenna boom 30.

Referring now to FIG. 3, a frontal view of the antenna boom 30 is displayed. The antenna boom 30 has an elongated body 32, and includes a clamp system 34 for its earlier noted support on the left tail support boom 26. Wiring or cabling 40 is also shown; those skilled in the art will appreciate that the wiring 40 may potentially support antenna signals for both intelligence communications and flight control.

Referring now also to FIG. 4, it will be appreciated that the antenna boom 30 is hollow, and that the wiring or cabling 40 extends fully through the hollow interior thereof to individual, i.e. first, second, and third, antenna arrays 44, 46, and 48, as shown. For purposes of protecting the relatively delicate antenna structures from harsh impacts, such as might occur during capture of the UAV 10, a frangible joint 50 is included within the structure of the antenna boom 30, as now described.

Figure 5:
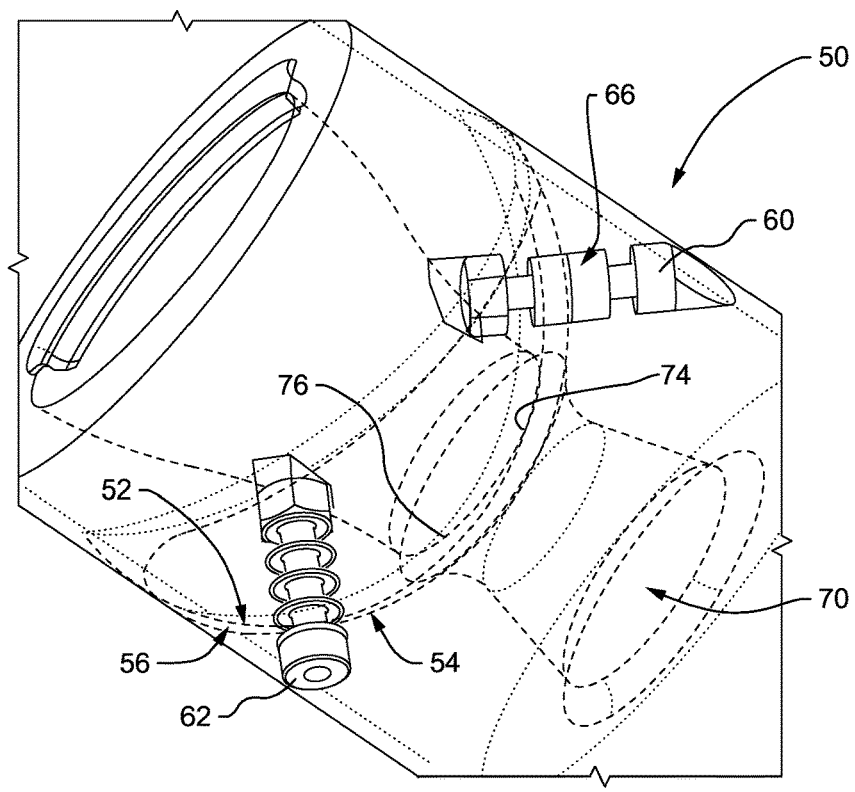
FIG. 5 is a perspective phantom-style "holographic" view of the frangible joint as contained in the detailed views of the antenna boom depicted in FIGS. 3 and 4.

FIG. 5 displays interior structures of the frangible joint 50, which include convex and concave hemispherical structural members 52, 54, each specifically identified by their mating surfaces 52, 54. The concave and convex portions comprise reversely identical mating parts of the joint 50, and define at least a theoretical ball and socket joint, in which the concave surface comprises at least a portion of a socket and the convex surface comprises a portion of a ball. However, in the described embodiment, the theoretical socket does not completely encompass the theoretical ball.

The surfaces 52, 54 define a contact interface 56 of the frangible joint members 52, 54. The interface 56 is retained under compression by at least one or more threaded fasteners 60, 62 (although actual threads are shown only in the case of fastener 62) to assure a rigid and secure, although frangible, joint 50. The fasters extend fully through each of the structural members 52, 54 by way of bushings 66 fixed within each of the structural members 52, 54 to support the fastener 60. (For purposes of revealing detail of the fasteners 60, 62, the bushing associated with the fastener 62 was been removed.) Bushings 66 are fixed within both members 52 and 54 for permitting reuse of all parts except for broken fasteners 60, 62. As described and shown herein, if two fasteners are utilized, the two fasteners 60, 62 are ideally positioned orthogonally with respect to one another to form a relatively stronger connection within a plane, e.g. as defined by the X-X and Y-Y axes (FIG. 1).

Continuing reference to FIG. 5, the fasteners 60, 62 are designed to shear under a predetermined load such as created by an impact of a rope line against the outboard part of the frangible joint 50 connected to a distal portion 80 (FIG. 3) of the antenna boom 30. Although the two parts are designed to become separated, the cabling and/or wiring 40 is not intended to be damaged by a defined system 100 (described below). As such, upon failure of the frangible joint 50, the failed fasteners 60, 62 may be replaced with new frangible fasteners 60, 62 to create an immediately reusable frangible joint 50.

The antenna boom 30 may be comprised of carbon fibers and/or lightweight plastics, while the bushings rigidly secured within the frangible joint 50 portion of the boom 30 may be formed of steel. To the extent that the frangible fasteners 60, 62 may be formed of a softer material, such as aluminum, the steel provides a stronger material against which to cause the aluminum fastener 60 to fail under a predetermined shear or combined shear and tensile impact load.

Continuing reference to FIG. 5, it will be appreciated that in order to accommodate passage of the wiring or cabling 40 the frangible joint will include aligned apertures 74, 76 within the convex and concave hemispherical structural members 52, 54, respectively. The aligned apertures thus form a part of a continuous cable port passageway 70 as shown in both FIGS. 3 and 4.

Figure 6:
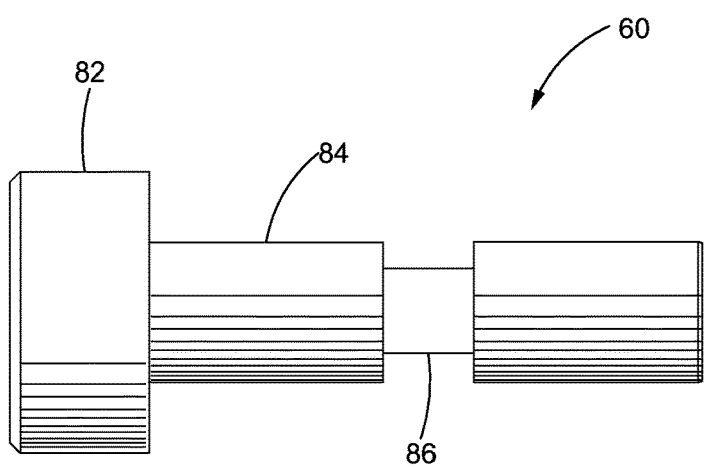
FIG. 6 is a perspective view of a fastener of the frangible joint of the present disclosure.

Referring now to FIG. 6, a more detailed representation of a aluminum frangible fastener 60 is depicted (albeit threads are not shown). The fastener includes a head 82, and a threaded shank portion 84. The shank portion includes a reduced diameter section 86, which may have a diameter reduction sized for achieving desired shear failure performance at a predetermined impact load. As such, the failure can be designed to occur omnidirectionally; i.e. irrespective of direction of an impact load with respect to the frangible joint 50.

Figure 7:
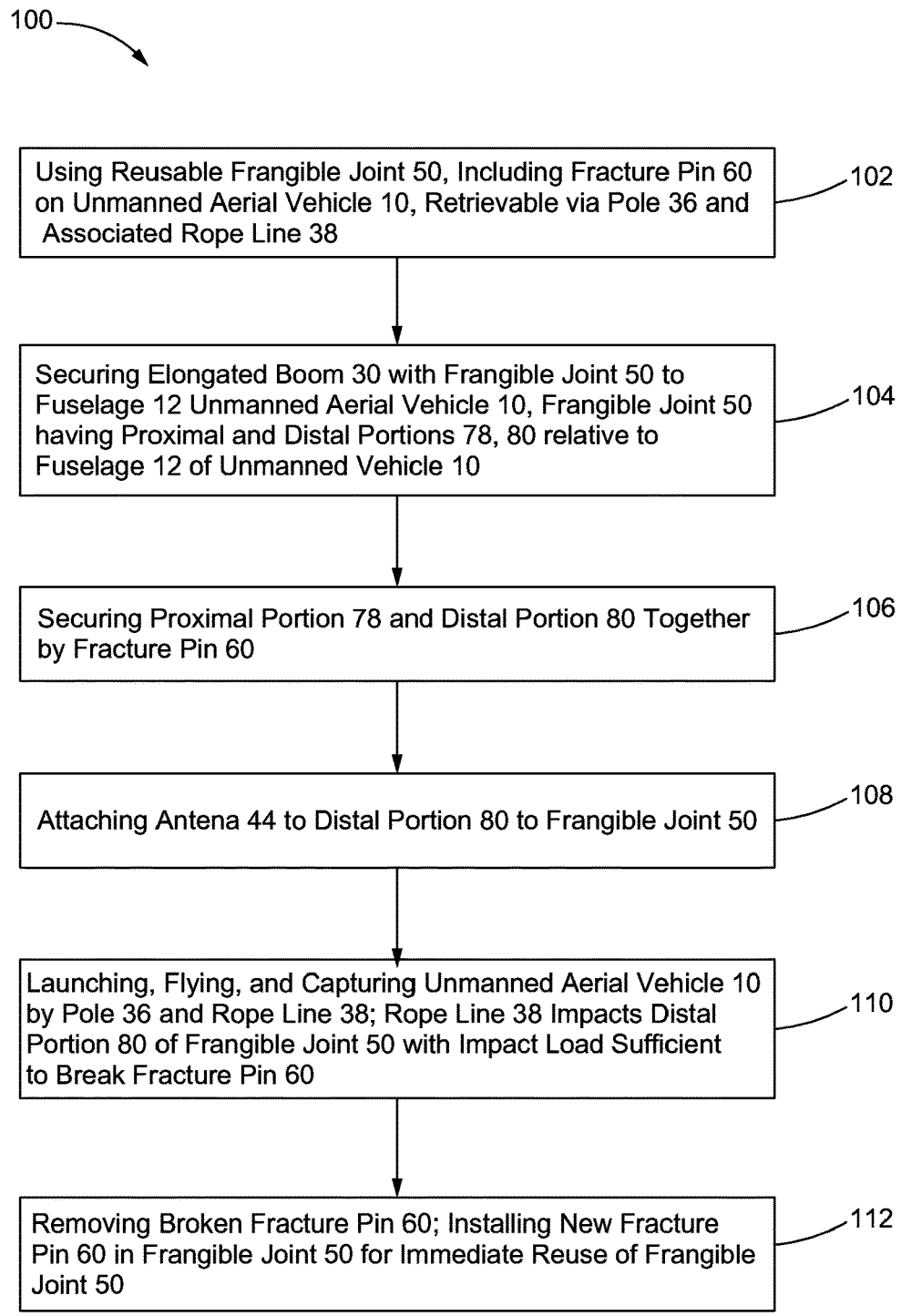
FIG. 7 is a flowchart of a system that utilizes the omnidirectional frangible joint, as may be constructed in accordance with the present disclosure.

Referring now to FIG. 7, a system 100 includes using a reusable frangible joint 50, having a fracture pin 60 on an unmanned aerial vehicle 10, retrievable via the pole 36 (FIG. 2) and its associated rope line 38 (Box 102). The system 100 further includes securing an elongated boom 30 containing a frangible joint 50 to a fuselage 12 of an unmanned aerial vehicle 10, the frangible joint 50 having proximal and distal portions 78, 80 (FIG. 3) with respect to the fuselage 12 of the unmanned aerial vehicle 10 (Box 104). The system 100 further includes securing the proximal and distal portions together by a fracture pin 60 (Box 106), and attaching an antenna 44 to the distal portion 80 of the frangible joint 50 (Box 108). The unmanned aerial vehicle 10 is then launched, flown, and subsequently captured while in flight by means of the rope line 38, such that the rope line impacts the distal portion of the frangible joint with an impact load sufficient to break the fracture pin 60 (Box 110). Finally, the fracture pin 60 is removed, and a new fracture pin 60 is installed within the frangible joint 50 to provide for immediate reuse of the frangible joint 50 (Box 112).

Figure 8:
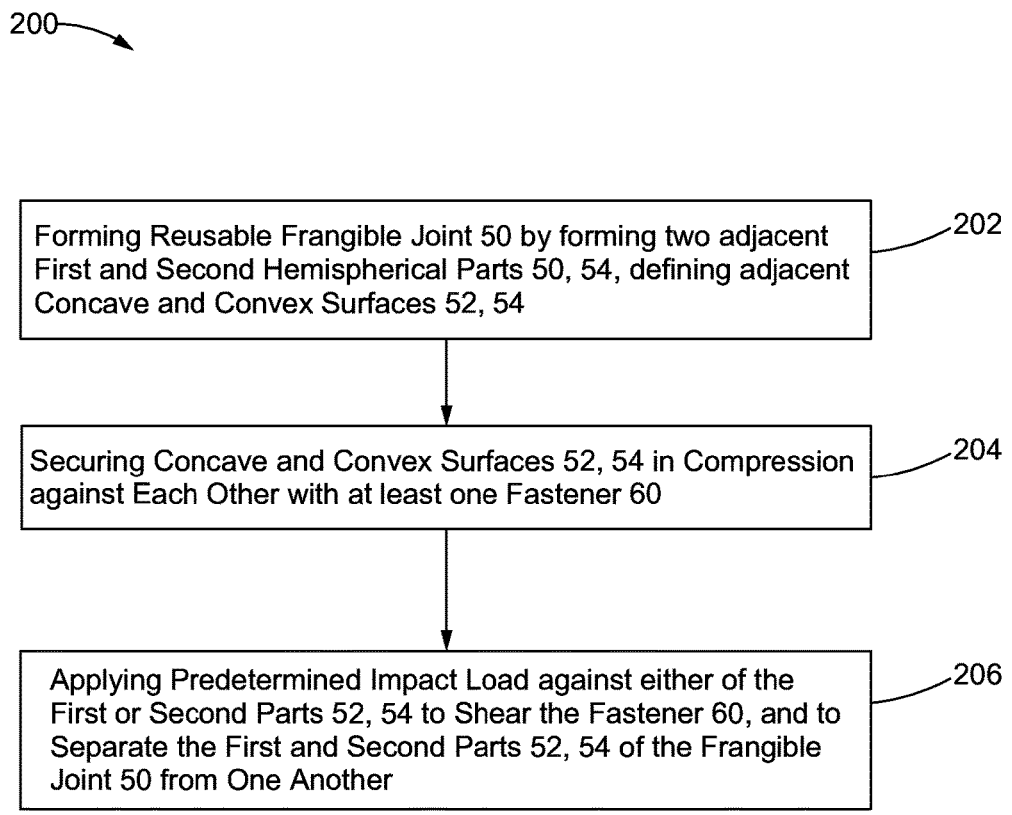
FIG. 8 is a flowchart of a method that utilizes the omnidirectional frangible joint, as may be constructed in accordance with the present disclosure.

Referring now to FIG. 8, a method 200 of making a reusable frangible joint 50 includes forming two adjacent first and second hemispherical parts 52, 54, the two parts defining adjacent concave and convex surfaces (Box 202), and securing the concave and convex surfaces in compression against each other with at least one fastener 60 (Box 204). A final step is applying a predetermined impact load against either of the first or second parts, wherein the load is configured to shear the fastener 60, and to separate the first and second parts 52, 54 of the frangible joint 50 from one another (Box 206).

In summary, this disclosure provides a light weight and low cost frangible joint 50 that allows for predetermined breakaway under impact loads applicable in multiple directions, up to and including a complete hemisphere. The frangible joint 50 also allows for the passage of electrical cabling if and as required for an application, as well as the ability to tune fastener design by number, position and geometry as necessary to achieve desired controlled failure characteristics.

The disclosed frangible joint 50, the system 100 of using, and the described method 200 of for making, may each have other variations and alternative constructions neither described nor suggested herein. For example, although described only in terms of a few materials, the antenna boom 30, the bushings 66 and the fasteners 60, 62 may be formed of materials other than the ones described. Moreover, other configurations and/or other components may be utilized in potentially in other environments, neither mentioned nor suggested herein. Further, the respective convex and concave hemispherical mating surfaces 52, 54 of the frangible joint 50 may contain features not specifically described herein, but yet cause the frangible joint 50 to react to an impact load in the same way. The fasteners 60, 62 may have alternative designs that may vary with respect to type, quantity, and or orientation not described herein. Finally, although the disclosure generally presents structures in only the shapes and sizes depicted, numerous variations of any of the disclosed structures may be envisioned for use in manufacture of alternative embodiments that operate and function in the manner as claimed below.

What is claimed is:

1. A reusable frangible joint comprising:
a first part having hemispherical convex surface;
a second part having a reversely identical mating hemispherical concave surface, with the concave surface being held in compression against the convex surface;
wherein each of the respective hemispherical concave and convex surfaces contains an aperture, and each of the apertures is aligned with the other;
at least one fastener securing the respective concave and convex surfaces rigidly together;
wherein the at least one fastener is spaced from, and oriented away from, the apertures; and
wherein a predetermined impact load applied against either of the first or second parts is configured to shear the fastener, and to separate the first and second parts from one another.

2. The reusable frangible joint of claim 1, wherein the impact load is omnidirectionally effective to shear the fastener, and wherein the fastener is sheared irrespective of whether applied to the first or second part.

3. The reusable frangible joint of claim 1, wherein the frangible joint is reusable upon removal of the sheared fastener and upon replacement thereof with a new fastener.

4. The reusable frangible joint of claim 1, wherein the two hemispherical surfaces comprise a ball and socket joint.

5. The reusable frangible joint of claim 4, wherein the concave surface comprises the socket, and the convex surface comprises the ball.

6. The reusable frangible joint of claim 5, wherein the socket does not completely encompass the ball.

7. The reusable frangible joint of claim 1, wherein two fasteners rigidly secure the respective concave and convex surfaces together.

8. The reusable frangible joint of claim 7, wherein the two fasteners are installed orthogonally with respect to one another.

9. A system including a reusable frangible joint having a fracture pin on an unmanned aerial vehicle retrievable via a vertical pole and rope line, the system comprising:
an elongated boom containing a frangible joint secured to an outer surface of an unmanned aerial vehicle, the frangible joint having proximal and distal portions with respect to the outer surface of the unmanned aerial vehicle, wherein the proximal and distal portions are secured together by a fracture pin;
wherein each of the respective proximal and distal portions contains an aperture, and each of the apertures is aligned with the other;
wherein the fracture pin is spaced from, and oriented away from, the apertures;
an antenna attached to the distal portion of the frangible joint;
wherein the unmanned aerial vehicle is configured to be launched, flown, and subsequently captured while in flight by means of a vertical pole and rope line, such that when the rope line impacts the distal portion of the frangible joint, an impact load will be sufficient to break the fracture pin; and
wherein the fracture pin is removable, and the frangible joint is configured for installation of a new fracture pin within the frangible joint to provide for reuse of the frangible joint.

10. The system of claim 9, wherein the impact load is omnidirectionally effective to shear the fastener, and wherein the fastener is sheared irrespective of whether the load is applied to the first or second portion of the frangible joint.

11. The system of claim 9, wherein one of the proximal and distal portions is concave and the other is convex.

12. The system of claim 11, wherein the concave and convex portions comprise reversely identical mating parts of the joint.

13. The system of claim 12, wherein the identical mating parts comprise hemispherical surfaces defining ball and socket structures.

14. The system of claim 13, wherein two fasteners rigidly secure the respective concave and convex surfaces together.

15. The system of claim 13, wherein the ball and socket structures each include bushings, and wherein each of the fasteners is secured through a bushing of each of the ball and socket structures.

16. The system of claim 14, wherein the two fasteners are installed orthogonally with respect to one another.

* * * * *